3,513,121
**AQUEOUS COMPOSITIONS FOR COATING
PERMEABLE SUBSTRATES**
John Raymond Douglas Heaton, Harlow, Essex, England,
assignor to Doverstrand Ltd., London, England, a British corporation
No Drawing. Filed Mar. 27, 1967, Ser. No. 625,978
Claims priority, application Great Britain, Mar. 25, 1966,
13,379/66
Int. Cl. C08d 7/00; C09d 3/76
U.S. Cl. 260—29.7          13 Claims

ABSTRACT OF THE DISCLOSURE

A binder composition for use in the pigment coating of a permeable substrate, such as paper or board, comprises a blend of copolymer latices one of which is dissolved in, or capable of being rendered soluble by alkali and which contains as one of its components butadiene or vinyl acetate, and the other of which is undissolved in, or is not capable of being rendered soluble by alkali. The non-alkali-soluble latex, which may be derived from a variety of polymerisable monomers, and may be a carboxylated butadiene/styrene resin, preferably constitutes from 80 to 95% by weight of the blend, while the alkali-soluble resin which may be a carboxylated butadiene/styrene/methacrylic acid resin or a copolymer of vinyl acetate and crotonic acid preferably constitutes from 20 to 5% by weight of the blend. The binder composition is mixed with pigment or filler, alkali and water to provide a pigment coating composition of good rheological properties which may be applied by an air knife or as a print coating and which results in a coated substrate with pleasing smooth surfaces and good pick strength.

---

This invention relates to aqueous coating compositions for coating permeable substrates, methods of coating using the composition and coated substrates produced by the process.

The permeable substrates with which the present invention is concerned are primarily paper, including wallpaper, and board, but other paper-like or felted substrates may be coated using the present compositions.

In the pigment coating of paper in the paper industry, many different types of coating are applied to a base paper. The two main essential ingredients used in paper coating are firstly the pigment or filler which is to be coated onto the base paper, and secondly the adhesive or binder which is used for bonding the pigment or filler to the base paper.

One of the adhesives which may be employed in paper coating in the United Kingdom is casein, although other proteinaceous material such as soya bean protein or zein may be more generally employed in the United States of America, but casein suffers the disadvantage that it is not usually suitable for making up a paper coating composition with a high solids content, such as is desired in the high speed coating of paper, because the viscosity of the resulting composition is too great to allow it to be applied easily.

Starch has also been used as an adhesive or binder, although greater amounts of starch may be required to give a pick strength equivalent to that obtained using a given quantity of casein. Coatings using starch as an adhesive also have a poorer wet rub strength than those based on casein, in addition to slightly lower levels of brightness and calenderability.

In order to improve the properties of the adhesive, it has been proposed to replace some of the starch or casein by synthetic resin latices and emulsions. These have the effect of reducing the viscosity for casein-based adhesives, and of improving both wet rub strength and pick strength of the starch-based coatings.

Attempts have been reported to use latices alone, but it is recognized that certain latices are often not practical as the only adhesive, or when used as the only adhesive require a small amount of alginate or similar protective colloid to prevent agglomeration of the pigment or filler and to improve the water-retention of the aqueous phase.

The starch or casein based coatings have good water-retention, that is to say when the coating is applied to the paper, the aqueous phase does not immediately soak into the paper. This is of particular importance in coating, especially when coating using an air knife, because if the water were to soak into the paper immediately the air knife would have to remove from the paper an excess of coating material having a much higher solids content than the originally applied coating composition which may lead to scoring on the coating or an orange peel effect. The alginate or similar protective colloid in the latex coatings also serves to improve the water-retention of the coating.

The coating compositions are generally made up by the paper coater, and in order to make up a casein-based composition it is necessary first to dissolve the casein in water which is then heated gently to a temperature not exceeding 60° C. Careful control of the heating is required in order not to degrade the casein during the heating. An alkali is then added to the casein solution, and the final solution is then added to a dispersion of the pigment or filler.

In making up a starch-based composition, the starch has generally first to be mixed with water and then cooked at a temperature of up to 80° C. for up to twenty minutes and then cooled before the starch solution can then be added to a dispersion of pigment or filler.

It is an object of the invention to provide a copolymer latex composition which may be used as the sole adhesive for compositions for coating permeable substrates.

We have now discovered that a suitable adhesive composition for use in coating permeable substrates comprises a blend of copolymer latices, one of which is non-alkali-soluble and the other of which is alkali-soluble. While it is possible to provide such a blend using entirely an alkali-soluble latex and adding sufficient alkali only to dissolve part of the latex, so that the remainder is not dissolved, the viscosity obtained in such a case would generally be so high that it is preferred that the two latices be different, and that the non-alkali-soluble latex be one which is not capable of being rendered soluble by alkali.

Accordingly, one aspect of the present invention provides an adhesive composition for use in coating a permeable substrate, comprising a blend of copolymer latices one of which is dissolved in, or capable of being rendered soluble by, alkali and which contains as one of its components butadiene or vinyl acetate, and the other of which is undissolved in, or is not capable of being rendered soluble by, alkali.

According to another aspect of the invention there is provided a composition for coating a permeable substrate, comprising an aqueous dispersion of pigment or filler, the adhesive composition just indicated, and sufficient alkali to dissolve the alkali-soluble latex, the water content being such as to render the composition suitable for coating.

According to yet another aspect of the present invention there is provided a method of coating a permeable substrate wherein the substrate is coated with the coating composition just indicated. The actual method by which the coating is applied is immaterial, and may be any of those conventionally employed in the art.

Yet a further aspect of the present invention resides in the substrate coated by the method just indicated. It has been proposed to use a blend of copolymer latices for coating permeable substrates of which one latex is an alkali-soluble acrylic copolymer and the other is non-alkali-soluble and is preferable, but need not be, an acrylic copolymer. However, acrylic copolymer latices are expensive and the present invention makes possible the use of cheaper butadiene-styrene latices or vinyl acetate copolymers which are more readily obtainable and cheaper than acrylic latices but which by themselves are not suitable as the sole adhesive or binder for paper coating for the reasons given above.

As indicated above, the permeable substrate may be any type of paper, including wallpaper, or board, and in the case where the substrate is wallpaper, the coating composition of the present invention may be applied as the ground coating and/or the print coating. It is also contemplated that the coatings of the present invention can be compounded with suitable pigments so as to be useful as printing inks, so that the term "coating" as employed in this specification is to be construed as including within its scope both continuous coating, as in the pigment coating of paper, and discontinuous coating as in the print coating of wall paper or other printing operations.

The adhesive composition of the present invention may comprise any copolymer latex of the non-alkali-soluble type blended with a copolymer latex of the alkali-soluble type, the latter latex preferably being present in a minor proportion. As indicated above, too much of the alkali-soluble latex is liable to raise the viscosity of the paper coating composition to unacceptable levels, and too much will also tend to reduce the wet pick strength and wet rub strength of the coated paper.

It will, of course, be recognized that the invention is not limited to blends of only two latices, of which one is alakali-soluble and the other is alkali-insoluble. For indeed in some instances where particular auxiliary or secondary properties are desired, it is feasible and may even be preferred to use three or more different latices.

Thus, the adhesive composition of the invention can be defined broadly as a blend or mixture of copolymer latices of which at least one is soluble in aqueous alkali solution and at least one is insoluble in aqueous alkali solution.

In general, the latices will be blended by the manufacturer of the latices, so that all that the paper coater needs to do is to add the blend of latices to a bath comprising an aqueous dispersion of the pigment or filler. The paper coater no longer needs to go to the expense and trouble of preparing separate solutions of binder by processes which have to be carefully controlled. Sufficient alkali will then be added by the paper coater to the bath to dissolve the alkali-soluble latex. Where the bath is used cold, especially in off-machine coating, the preferred alkali may be ammonia or an amine, as during subsequent drying and calendering of the paper most of the ammonia, or amine if it is volatile, will be removed, thereby rendering the alkali-soluble resin insoluble in water. However, where the bath is heated, or is liable to become heated such as in machine coating, it may be preferred to use a fixed alkali such as caustic soda, because otherwise the loss of ammonia or volatile amine from the heated bath might lead to an undesirable increase in the viscosity of the bath.

Suitable non-alkali-soluble resins and carboxylated butadiene/styrene, butadiene/acrylonitrile or butadiene methylmethacrylate in which the carboxyl-containing monomer comprises no more than about 20% by weight of the copolymer and preferably less than about 10% by weight of the copolymer. A particular suitable alkali-insoluble type of latex contains as the dispersed resin component a polymer formed from 55% by weight of styrene, 3% of itaconic acid and 42% of butadiene, or a similar resin using methylmethacrylate instead of styrene.

Suitable types of alkali-soluble resins include the carboxylated butadiene/styrene, butadiene/acrylonitrile a butadiene methylmethacrylate in which the carboxyl-containing monomer comprises at least about 30% by weight of the copolymer and preferably at least about 40% by weight of the copolymer. A particularly suitable alkali-soluble type of latex contains butadiene/styrene/methacrylic acid resins, such as those made from 33% to 53% by weight butadiene, from 20% to 0% styrene, 45% methacrylic acid and 2% fumaric acid. Other suitable alkali-soluble resins include the copolymer of 90% vinyl acetate and 10% crotonic acid, polyvinyl acetate, polyacrylamide and the like.

A reduction in the styrene content of the resins may reduce the stiffness of paper coated with the composition, but will generally result in an improved pick strength, and control of the degree of stiffness may accordingly be obtained by appropriate choice of the styrene content of the resin, which may be increased to 67% in the non-alkali soluble resins, especially where no styrene is present in the alkali-soluble resin. As used herein, the term "copolymer" is meant to include not only bipolymers but also ter- and multipolymers.

The presence of the alkali-soluble latex improves the water retention and rheological properties of the composition, so that when the composition is applied to the permeable substrate, the water is not immediately soaked up thereby. As indicated above, this is of particular advantage when coating using an air knife as the excess coating composition to be removed by the air knife is still in a fluid state, whereby scoring of the coating and the formation of an orange peel surface are avoided. Thus, the presence of the alkali-soluble latex permits better control of the flow properties of the coating composition.

It will be appreciated that the amounts of the components of the coating composition of the present invention may be varied as desired, and will depend upon the nature of the substrate, the nature of the pigment and the type of coating which it is desired to apply. Furthermore, it will also depend upon the properties of the two types of latices. By regulating the amount of alkali-soluble latex in the coating composition it is possible to control the degree of distribution or migration of the adhesive or binder in the paper or board being coated. Without the alkali-soluble latex, the adhesive might be absorbed so much by the paper or board as virtually to leave on the surface of the paper or board a film of insufficiently adherent pigment or filler.

Since in certain cases it may be desirable to include other components in the coating composition, such as starch, casein, polyvinyl alcohol and other components conventionally added to paper- or board-coating compositions, the use of such other components is not excluded, even though it is the intention of the invention to provide coating compositions in which starch and casein are absent so as to avoid the disadvantages of using them.

Preferably the non-alkali-soluble latex constitutes 80 to 95% by weight of the blend, more preferably about 90%, while correspondingly the alkali-soluble latex constitutes 5 to 20% by weight of the blend, more preferably about 10%. The relative amounts of the alkali-soluble and alkali-insoluble are of particular importance when the mixture is rendered alkaline to dissolve the former in that if greater than about 20% alkali-soluble latex is used, the resultant alkaline mixture is too viscous to be applied properly to the paper. On the other hand if less than about 5% of the alkali-soluble resin is used, the advantages of the invention, as set out hereinbelow, are not achieved.

The use of the latex adhesive binder of the present invention provides higher binding strength as compared with starch or casein and thus enables less binder to be used, thus improving the printing properties and appearance of the paper. Furthermore, higher wet strengths are obtainable than when using starch, and lower viscosities are obtainable than when casein, thereby making it easier to make up the pigment or filler dispersions.

As the resins are thermoplastic, the coated paper has improved calendering properties as it is possible to obtain equivalent gloss to a starch or resin bonded paper with less calendering, and the reduction in calendering pressure means that the internal structure of the paper is not damaged to such an extent as when using high calendering pressures.

The invention will now be illustrated by the following examples:

EXAMPLE 1

A white-lined box-board was coated using an air knife with an aqueous coating composition comprising:

|  | 100 Parts by weight |
|---|---|
| Commercially available coating clay (known in the trade as SPS clay) | 100 |
| Tetrasodium pyrophosphate | 0.35 |
| Latex/casein (ammoniated) binder (50:50) | 18 |

Water to give viscosity suitable for air knife coating and composition of approximately 40% coatings solids content. The latex was a carboxylated styrene/butadiene copolymer latex of which the copolymer contained about 55% styrene, 42% butadiene and 3% itaconic acid.

EXAMPLE 2

Following the procedure of Example 1, another sample of the white lined box-board was coated with an aqueous composition comprising:

|  | 100 Parts by weight |
|---|---|
| SPS clay | 100 |
| Tetrasodium pyrophosphate | 0.35 |
| Carboxylated styrene/butadiene copolymer latex of Example 1 | 16 |

Water to give a viscosity suitable for air knife coating and solids content of approximately 48%.

EXAMPLE 3

Following the procedure of Example 1, a third sample of the white-lined box-board was coated with an aqueous coating composition comprising:

|  | 100 Parts by weight |
|---|---|
| SPS clay | 100 |
| Tetrasodium pyrophosphate | 0.35 |
| Non-alkali-soluble latex plus alkali-soluble latex | 16 |
| Ammonia, sufficient to give pH of 9 to 9.5. | |

Water to give viscosity suitable for air knife coating and composition of approximately 48% solids content. The latex mixture comprises 90 parts by weight of a non-alkali-soluble latex formed from 55% styrene, 42% butadiene and 3% itaconic acid, and 10 parts by weight of an alkali-soluble latex formed from 20% styrene, 33% butadiene, 45% methacrylic acid, 2% fumaric acid.

The properties of the three coatings are compared in the foregoing table.

|  | Example 1 | Example 2 | Example 3 |
|---|---|---|---|
| I.G.T. Pick strength (ink No. 3) | 300 ft./min | 300 ft./min | 750 ft./min. |
| Wet rub (TAPPI Routine Control Method RC-185). | Satisfactory for off-set litho printing after 48 hours. | About the same as Example 1. | Satisfactory for off-set litho printing immediately after coating. |
| Appearance of I.G.T. ink strip. | Dull, matt finish. | Rough irregular finish due to uneven ink penetration. | Gloss finish. |

The board coated in accordance with Example 2 had a rough irregular finish and a poor printing surface. It was difficult to control the coating weight due to the poorer rheological properties of the composition than those of Example 1.

However, the texture of the board coated in accordance with Example 3 was characterized by a more pleasing, smoother surface with a more satin-like finish than those obtained in accordance with Examples 1 and 2 and this shows the value of the alkali-soluble latex in controlling the rheological properties of the composition and ensuring satisfactory migration of the binder or adhesive into the board.

EXAMPLE 4

Equally good results were obtained when the non-alkali soluble latex of Example 3 was replaced by one formed from 55% methylmethacrylate, 41.5% butadiene and 3.5% itaconic acid.

EXAMPLES 5 TO 7

Aqueous coating compositions were prepared of the following composition:

|  | Parts by weight |
|---|---|
| SPS clay | 100 |
| Sodium hexametaphosphate | 0.35 |
| Latex | 12 |
| Ammonia to give pH of 9.5. | |

Water to give viscosity suitable for air knife coating.

The compositions were coated using an air knife onto standard coating base paper. The results were as follows:

| Example | 5 | 6 | 7 |
|---|---|---|---|
| Latex composition by weight. | (1) 55% styrene, 43% butadiene and 2% fumaric acid. | (1) 90% of latex of Example 5. 10% of a copolymer of 90% vinyl acetate and 10% crotonic acid. | (1) 90% of a copolymer of 67% styrene, 31% butadiene and 2% fumaric acid. (2) 10% of the vinyl acetate/crotonic acid copolymer of Example 6. |
| IGT Pick Strength (Ink No. 2). | 140 ft./min | 200 ft./min | 158 ft./min. |
| Wet rub | Poor | Poor | Good. |
| K and N Ink Hold out (TAPPI Routine Control Method RC-19). | do | do | Do. |

The coated papers of Examples 6 and 7 had better smoothness, printing surfaces and calender gloss than the coated paper of Example 5. The coated paper of Example 7 had an improved stiffness as compared with the coated paper of Example 6, due to the increased styrene content of the non-alkali soluble later (1). However, this improved stiffness was obtained at the expense of the pick strength.

The following examples illustrate the invention, having the same advantages shown in the foregoing examples, when it is comprised of more than one latex of each type, as regards alkali-solubility.

EXAMPLE 8

| | Parts by weight |
|---|---|
| Kaolin | 100 |
| Sodium hexametaphosphate | 0.35 |
| Latex of copolymer of 42% butadiene, 56% styrene and 2% itaconic acid | 7.2 |
| Latex of copolymer of 53% butadiene, 45% styrene and 2% maleic anhydride | 7.2 |
| Latex of copolymer of 35% butadiene, 33% styrene, 2% fumaric acid and 30% methacrylic acid | 3.6 |

Water to give coating solids content of 48%.
Ammonia to give pH 9 to 9.5.

EXAMPLE 9

| | Parts by weight |
|---|---|
| Kaolin | 100 |
| Sodium hexametaphosphate | 0.35 |
| Latex of copolymer of 70% butadiene, 29% styrene and 1% fumaric acid | 14.1 |
| Latex of copolymer of 40% butadiene, 25% styrene, 10% itaconic acid and 25% methacrylic acid | 1.0 |
| Copolymer of 90% vinyl acetate and 10% crotonic acid | 0.9 |

Water to give coating solids content of 46%.
Ammonia to give pH 9 to 9.5.

EXAMPLE 10

| | Parts by weight |
|---|---|
| Kaolin | 100 |
| Tetrasodium pyrophosphate | 0.35 |
| Latex of copolymer of 61% butadiene, 35% acrylonitrile, 3% fumaric acid and 1% methacrylic acid | 8.2 |
| Latex of copolymer of 87% butadiene, 10% methylmethacrylate and 3% fumaric acid | 10.8 |
| Latex of copolymer of 33% butadiene, 35% styrene, 12% methacrylic acid and 20% itaconic acid | 1.0 |

Water to give coating solids content of 46%.
Ammonia to give pH 9 to 9.5.

EXAMPLE 11

| | Parts by weight |
|---|---|
| Kaolin | 100 |
| Tetrasodium pyrophosphate | 0.35 |
| Latex of copolymer of 42% butadiene, 55% styrene and 3% itaconic acid | 15 |
| Latex of copolymer of 40% butadiene, 20% styrene, 40% methacrylic acid | 4 |
| Latex of copolymer of 30% butadiene, 35% styrene, 30% acrylic acid and 5% fumaric acid | 1 |

Water to give coating solids content of 52%.
Ammonia to give pH 9 to 9.5.

While alkali metal phosphates were employed in each of the preceding examples, it will be recognized by those skilled in the art that other clay dispersants can be used such as caustic and organic surfactants.

What is claimed is:

1. An adhesive composition for use in coating permeable substrates comprising a blend of about 80 to 95 percent by weight, based on dry copolymer solids, of an alkali insoluble latex of a carboxylated butadiene copolymer and about 5 to 20 percent by weight, based on dry copolymer solids, of an alkali soluble latex of another carboxylated copolymer selected from the group consisting of carboxylated butadiene copolymers containing at least about 30 percent by weight of carboxylated monomer and copolymers of vinyl acetate and an ethylenically unsaturated carboxylic acid.

2. The composition of claim 1 in which the alkali-soluble latex is a latex of a copolymer of butadiene, a monomer selected from the group consisting of styrene, acrylonitrile and methylmethacrylate and at least about 30% by weight of ethylenically unsaturated carboxylic acid.

3. The composition of claim 1 in which the alkali-soluble latex is a latex of a carboxylated copolymer of butadiene, a monomer selected from the group consisting of styrene, acrylonitrile and methylmethacrylate and an acrylic acid, said copolymer containing at least about 30% by weight of said acid.

4. The composition of claim 1 in which the alkali-soluble latex is a latex of a carboxylated copolymer of butadiene, a monomer selected from the group consisting of styrene, acrylonitrile and methylmethacrylate and methacrylic acid, said copolymer containing at least about 30% by weight of said acid.

5. The composition of claim 1 in which the alkali-soluble latex is a latex of a copolymer of vinyl acetate and an ethylenically unsaturated carboxylic acid.

6. The composition of claim 1 in which the alkali insoluble carboxylated butadiene copolymer is a latex of a copolymer of butadiene, a monomer selected from the group consisting of styrene, acrylonitrile, and methyl methacrylate and not more than 20 percent by weight of an ethylenically unsaturated carboxyl-containing monomer.

7. The composition of claim 1 in which the alkali insoluble latex is a latex of a copolymer containing 55 percent by weight styrene, 3 percent by weight of itaconic acid, and 42 percent by weight of butadiene.

8. The composition of claim 1 in which the alkali soluble latex is a latex of a copolymer containing from about 33 to 53 percent by weight of butadiene, from about 0 to 20 percent by weight of styrene, about 45 percent by weight of methacrylic acid, and about 2 percent fumaric acid.

9. The composition of claim 1 in which the alkali soluble latex is a latex of a copolymer containing 90 percent by weight of vinyl acetate and 10 percent by weight of crotonic acid.

10. A composition for coating permeable substrates comprising a dispersion of inorganic pigment or filler; a blend of about 80 to 95 percent by weight, based on dry copolymer solids, of an alkali insoluble latex of a carboxylated butadiene copolymer and about 5 to 20 percent by weight, based on dry copolymer solids, of an alkali soluble latex of another carboxylated copolymer selected from the group consisting of carboxylated butadiene copolymers containing at least about 30 percent by weight of carboxylated monomer, and copolymers of vinyl acetate and an ethylenically unsaturated carboxylic acid.

11. The composition of claim 10 in which the alkali is volatile under drying conditions.

12. The composition of claim 10 in which the alkali is selected from the group consisting of ammonia and volatile organic amines.

13. A permeable substrate having a coating on at least one side which comprises a mixture of pigment or filler with deposited polymeric solids of a blend of about 80 to 95 percent by weight, based on dry copolymer solids, of an alkali insoluble latex of a carboxylated butadiene copolymer and about 5 to 20 percent by weight, based on the dry copolymer solids, of an alkali soluble latex of another carboxylated copolymer selected from the group consisting of carboxylated butadiene copolymers containing at least 30 percent by weight of carboxylated monomer and copolymers of vinyl acetate and an ethylenically unsaturated carboxylic acid, said coating having been formed by removal of water from an aqueous alkaline dispersion of said mixture and of said blend deposited on the substrate in which the alkali soluble latex was essentially completely dissolved.

References Cited

UNITED STATES PATENTS

| | | |
|---|---|---|
| 2,875,167 | 2/1959 | Minor et al. |
| 3,081,198 | 3/1963 | Miller. |
| 3,366,588 | 1/1968 | Booth. |

FOREIGN PATENTS 810,575   3/1959   Great Britain.

MURRAY TILLMAN, Primary Examiner

W. J. BRIGGS, Sr., Assistant Examiner

U.S. Cl. X.R.

117—148, 155, 161; 260—887, 894

UNITED STATES PATENT OFFICE

CERTIFICATE OF CORRECTION

Patent No. 3,513,121                                                 May 19, 1970

John Raymond Douglas Heaton

It is certified that error appears in the above identified patent and that said Letters Patent are hereby corrected as shown below:

Column 6, line 13, "Poor" should read -- Good --.

Signed and sealed this 5th day of January 1971.

(SEAL)
Attest:

Edward M. Fletcher, Jr.                              WILLIAM E. SCHUYLER, JR.
Attesting Officer                                               Commissioner of Patents